(12) United States Patent
Smyros et al.

(10) Patent No.: US 9,922,115 B1
(45) Date of Patent: Mar. 20, 2018

(54) COMPOSITE STORAGE

(71) Applicants: Athena Ann Smyros, Gunter, TX (US); Constantine John Smyros, Gunter, TX (US)

(72) Inventors: Athena Ann Smyros, Gunter, TX (US); Constantine John Smyros, Gunter, TX (US)

(73) Assignee: Intelligent Language, LLC, Richardson, TX (US)

( * ) Notice: Subject to any disclaimer, the term of this patent is extended or adjusted under 35 U.S.C. 154(b) by 0 days.

(21) Appl. No.: 13/763,710

(22) Filed: Feb. 10, 2013

Related U.S. Application Data

(60) Provisional application No. 61/597,243, filed on Feb. 10, 2012.

(51) Int. Cl.
*G06F 17/30* (2006.01)
(52) U.S. Cl.
CPC .......................... *G06F 17/30631* (2013.01)

(58) Field of Classification Search
USPC .................................................. 707/741
See application file for complete search history.

(56) References Cited

U.S. PATENT DOCUMENTS

| | | | | |
|---|---|---|---|---|
| 5,809,502 | A * | 9/1998 | Burrows | |
| 5,873,076 | A * | 2/1999 | Barr | G06F 17/30864 704/270.1 |
| 7,079,056 | B2 * | 7/2006 | Weaver | 341/106 |
| 8,473,523 | B2 * | 6/2013 | Goyal | 707/798 |
| 2010/0017400 | A1 * | 1/2010 | Engel | 707/5 |
| 2016/0062954 | A1 * | 3/2016 | Ruff | G06F 17/21 715/249 |

* cited by examiner

*Primary Examiner* — Cam-Y Truong
(74) *Attorney, Agent, or Firm* — Slater Matsil, LLP (57) ABSTRACT

The present application relates in general to information retrieval and repository management system and in particular to composite storage that efficiently and compactly stores all grammatical information, including text and non-text information, about a document or a set of documents, as well as various measures based on the language used within such documents to allow any size device to manage the information that it requires to perform its functions.

13 Claims, 6 Drawing Sheets

Composite Storage Flowchart.

| The | quick | brown | dog | jumped | over | the | lazy | red | and | brown | fox | . |
|---|---|---|---|---|---|---|---|---|---|---|---|---|
| 1 | 2 | 3 | 4 | 5 | 6 | 7 | 8 | 9 | 10 | 11 | 12 | 13 |

FIG. 1 Parsed Text Input.

| 201 | 202 |
|---|---|
| 1000 | over |
| 1010 | and |
| 1020 | the |
| 1500 | period mark (.) |
| 5000 | quick |
| 5010 | brown |
| 5020 | dog |
| 5030 | jumped |
| 5040 | lazy |
| 5050 | red |
| 5060 | fox |

FTU/CTU Boundary;
above the line = FTU
below the line = CTU

FIG. 2 Windex Entries for Example Text and Boundary.

FIG. 3. ISetM Index.

| 898788896766 | |
|---|---|
| 1000 | 6 |
| 1010 | 7 |
| 1030 | 10 |
| 1011 | 1 |
| 1500 | 13 |
| 5000 | 2 |
| 5010 | 3, 11 |
| 5020 | 4 |
| 5030 | 5 |
| 5040 | 8 |
| 5050 | 9 |
| 5060 | 12 |

402    403

FIG. 4. WindexBlock Index.

FIG. 5. Composite Storage Flowchart.

FIG. 6. Graphics Example.

FIG. 7. Word Block Index and Grammar Values.

FIG. 8. Overlays.

FIG. 9. Example of Multiple Regions in an ISetM.

COMPOSITE STORAGE

RELATED APPLICATIONS

This application claims priority from Provisional Application No. 61/597,243, entitled "Composite Storage", filed 10 Feb. 2012, the disclosure of which is hereby incorporated herein by reference.

SUMMARY

The present application relates in general to information retrieval and repository management system and in particular to composite storage that efficiently and compactly stores all grammatical information, including text and non-text information, about a document or a set of documents, as well as various measures based on the language used within such documents to allow any size device to manage the information that it requires to perform its functions.

BRIEF DESCRIPTION OF THE DRAWINGS

The accompanying drawings are incorporated in and are a part of this specification. Understanding that these drawings illustrate only typical embodiments of the invention and are not therefore to be considered to be limiting of its scope, the invention will be described and explained more fully through the use of these accompanying drawings in which.

DETAILED DESCRIPTION OF THE INVENTION

Composite Storage is a knowledge model designed to effectively store and retrieve natural language information and other types of information found in any type of documentation, including messaging, word-processing documents, email, graphics, speech, multimedia, and any other kind of file. To encompass these terms, the information set member (ISetM) is used and is defined as the set of data stored in a finite amount of time. From a small robotic device to a large data center, any size data set can be used with the system. Natural language in this context refers to any human-based written or oral mode of a specific language, such as English, while other types of information include items such as codes, computer programs, and other graphical and aural forms. For any implementation using composite storage, any file or data structure similar to a file that contains information can be used to model that file into an analytical language and information model that is searchable and retrievable. Composite in this context refers to the total amount of information that is considered usable for a given implementation. Any information set (ISet) or a repository, without regard to underlying information domains, can be used with this system. In addition, a composite storage system may be employed as part of an application for information retrieval, natural language processing, or may be part of a file system that supports natural language as part of an operating system. In a file system, the composite storage would be augmented by input/output (I/O) interfaces and include hardware storage requirements. Any input that requires persistent or temporary storage may use this system. The methods described can work with existing file systems or be used alone.

Figure 1:
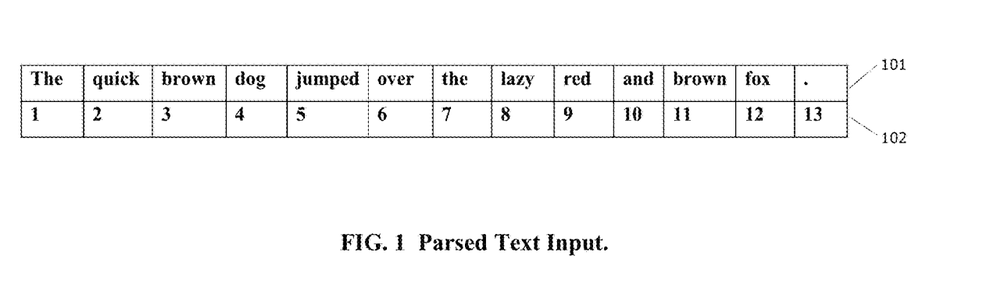
FIG. 1 illustrates an example of Parsed Text Input that is usable with the embodiments described herein.

The construction of Composite Storage begins with the input being sent to the system. Any communications method can be used to deliver the input, so long as the file, message, or other such data can be reliably sent. The file, once in the system goes through a parsing operation. An example of the output of such a parsing system is illustrated in FIG. 1. Any parsing algorithm in use of a given language can be used. A preferred method involves grammar rules and is illustrated in U.S. Patent Application Pub. No. 2011/0125728, entitled "SYSTEMS AND METHODS FOR INDEXING INFORMATION FOR A SEARCH ENGINE," filed on 31 Jan. 2011, which is incorporated herein by reference in its entirety, which is also cited in MULTIPART INDEX, filed on 24 Sep. 2012, Ser. No. 13/625,819, which is incorporated herein by reference in its entirety. In this example, certain punctuation is separated from the word so that the word can be isolated and identified; this is shown in 101. Each word has been parsed, along with separating the punctuation, including the period in this case. This forms the term unit (TU) that represents the parsed entity. In addition, the positions or posits 102 that the data stream came in are also illustrated for example purposes only.

This general framework for parsing may be modified based on implementation requirements for the type of possible data retrieval or language representations. For instance, consider the message input "The XYZ Company email system (Esys) is operational." The general parsing method would separate the terms as: the, XYZ, Company, email, system, Esys, is, operational. Additional requirements may need to determine the relation between different characters in the term, denoted as Identifiable Units (IUs). A system tasked to locate delivery methods context would need to locate "email" and recognize that the "e" in email stands for electronic. The character "e" would be considered an IU, and contains an additional meaning that can be extracted and expressed within the language of the message, in this case English. The storage of an IU is nested under the TU storage and should be mappable. Depending on the future request of the system, it may not be used or may be used, as in this example to relate it to other expressions of electronic mail, such as "e-mail".

Figure 2:
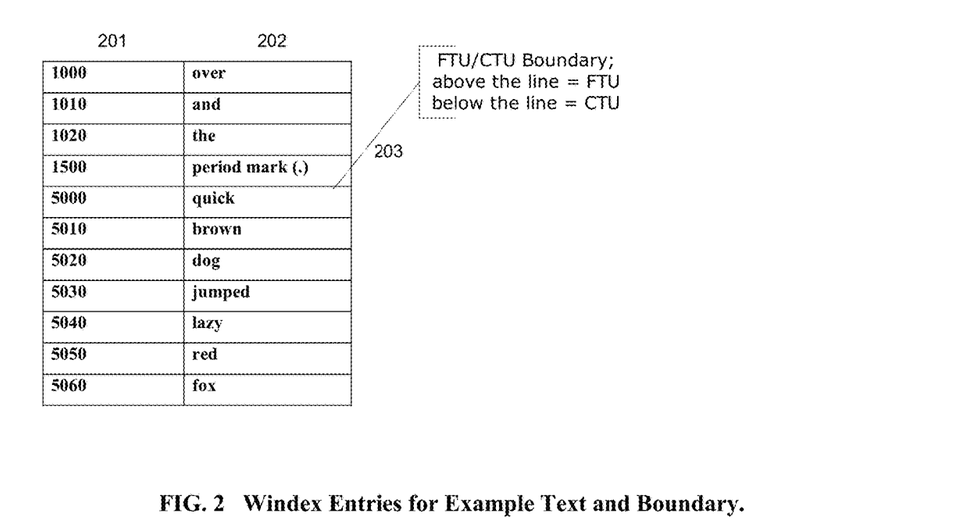
FIG. 2 illustrates an example of Windex Entries for example text and boundaries that are usable with the embodiments described herein.

FIG. 2 illustrates the basic concepts that are involved in building a Windex, which are the encoding in a numeric form of each word or TU in the file. If an IU is required for an implementation, it may be tracked using Windex encoding by reserving numbers for related terms (such as email, e-mail being assigned numbers 4080 and 4084, respectively;

or another data store that relates the Windex to a set of relatable expressions, as shown in ADAPTIVE DATA STORE, filed on 24 Sep. 2012, Ser. No. 13/625,815, which is incorporated herein by reference in its entirety.

Item 201 illustrates a possible encoding of the terms in the example illustrated in FIG. 1. Note that this assumes that only the current file has been added to a Windex file. There is generally one Windex per a repository or group of files; it may be limited by the size of the numbers that can be supported by a particular hardware implementation. In this case, there is an arbitrary starting point for beginning the encoding, which is the number 1000. For each term in the file, the number is increased by a specific amount. The actual amount of the increment can be determined by any number of methods, including a simple increment variable, a grammatically calculated increment, or different language forms of a character that can be used in combination (such as dog, Dog, DOG). Item 202 illustrates the example's terms that are added to the index. Depending on the construction of the increment, only a particular form is added to the Windex, as "the" and "The", where "the" is added to the Windex, but "The" is considered one of the incremented values that can be solved by a formula.

There are several ways to separate terms using a simple integer comparison, and one such way is shown in item 203. In this case, the terms are considered to be related to a specific language, and the language can further be separated into functional term units (FTU) and content term units (CTU). An FTU represents terms such as "an, the" that have no specific meaning except their relation to a CTU, which represents terms that have a unique set of meanings for a specific language. The FTU starts at 1000 in the figure, and the CTU starts at 5000. Note that this division is not required to be stored directly into the Windex, and therefore any number of divisions can be supported by a single Windex and can be determined using any numeric function. If other files are added to this repository's Windex, then the same process is done for each file that is added. Note that each term is added only once, and if there is a supported version for the form of the input, such as the term "DOG" is found, then if it found to be related to "dog", then it is not added to the Windex directly as it can be solved for and covered by the increment variable for the entry "dog".

The Windex has several uses for information retrieval and natural-language-specific tasks. First, the system only has to look at the Windex value to determine, using the FTU/CTU example found in 203, this division. It is simply calculated and therefore can be used to isolate keywords, objects, and other information without requiring any cumbersome storage such as POS taggers, etc. In addition, any related forms, such as capitalization forms, can be related to other forms without an additional storage penalty. This may also be expanded to store IU data, such as the email example above, by grouping related terms similar to the method used for discerning FTU/CTUs by reserving a group of Windexes for this purpose. Also, the integer values allow for standard sorting algorithms to be used so that any linear order can be applied to either the entire ISetM or any subset of the ISetM, which represent a significant savings. Further, the assignment of the Windex values is arbitrary, and one ISet may have "dog" assigned to Windex 39090, whereas in this example "dog" is assigned to Windex 5020.

Figure 3:
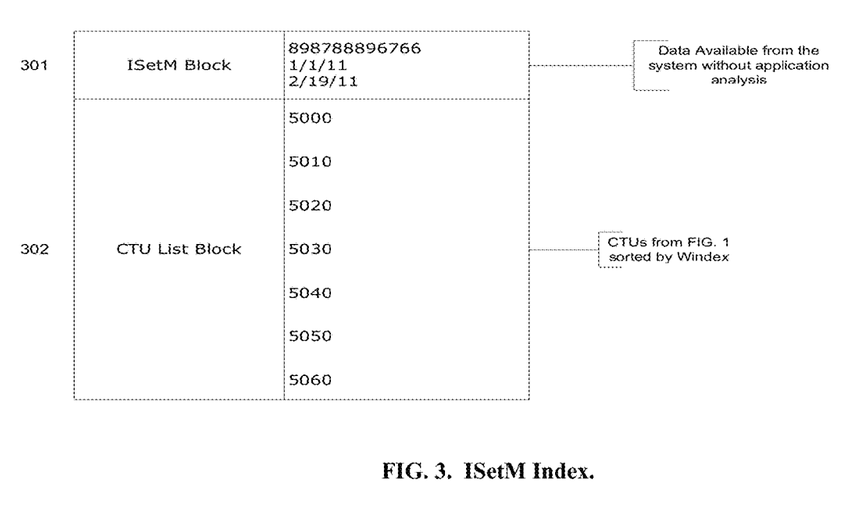
FIG. 3 illustrates an example of an ISetM Index that is usable with the embodiments described herein.

The Windex process can operate while the ISetM Index process in FIG. 3 operates, noting that the Windex process for an ISetM should complete before the ISetM Index process completes. Item 301 illustrates the type of information found within the ISetM block, the first part of the ISetM Index. The ISetM contains first a way of identifying it uniquely within a repository. Any underlying system of organization can be used to determine a unique mode. In one example, the file path, filename, and the file extension form the unique identify or ISetM ID, such as "c:\canine relations\dog\dog and fox.txt". When used as a file system, the directory addressing may not be required as the location is determined solely by its position within the ISetM index. In another example, illustrated in FIG. 3, the string is reduced to a numeric value since HTTP and other addressing systems are used within the example repository. In addition, other file information that can be used by an implementation should be collected here that is available from the file system. Item 301 illustrates these by the use of the creation date and the last modified date available in the file system from where the ISetMs originally came. Other such data, depending on the implementation, can be added to this block. Note that the input does not require previous file system information in order to function. For instance, in realtime systems, such file information may be directly calculated by the available system hardware, such as when a medical devices receives a signal that a control threshold has been reached.

As Windexes are identified, the CTU List Block 302 contains the Windex values that are, in the example Windexes illustrated in FIG. 2. In this case, the CTU List block is one of the divisions that is available in the Windex. Any List Block based on Windex division can be used. For instance, if the Windex is divided by FTU and CTU, and then subdivided in the CTU for terms that are related to "dog", such that they map to Windex values 1,000,000 and 1,100,000. If the ISetM does not contain such a value within this range, regardless of the alphanumeric order of the terms, the ISetM is not responsive to the input. The purpose of this List Block is to isolate that terms that most easily differentiate this document from another document for purposes of information retrieval and analysis. Most times, an information retrieval request focuses on a few terms that can be used to filter the ISetM to test if the ISetM either is responsive to an input or not.

Figure 4:
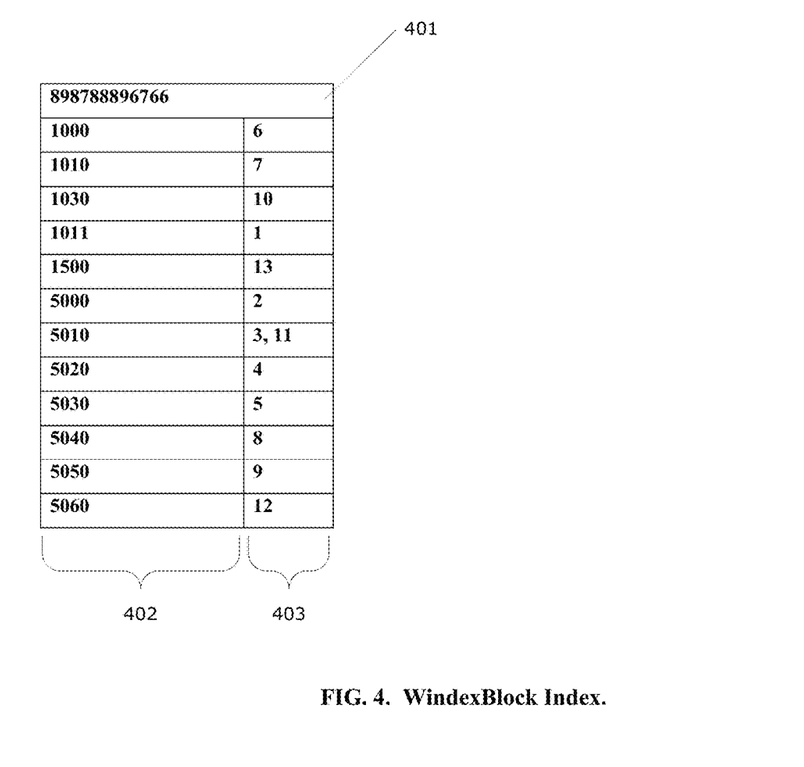
FIG. 4 illustrates an example of an WindexBlock Index that is usable with the embodiments described herein.

FIG. 4 illustrates the Windex Block Index, and similar to the ISetM Index, there is one entry for each ISetM in the ISet. This models the relation between the Windex and the posits (as shown in FIG. 1) found in the document. This is how the reconstruction of a ISetM can be performed, as well as the type of information, including frequency and other information retrieval information that is necessary to respond to any type of user queries. Item 401 illustrates the ISetM ID that is required to identify the entry. In this case, that is all that is required. Some implementations, however, may add data, such as the number of posits for the ISetM, which represent the length of the document, the language of the document, and other such data. Items 402 and 403 show in a simple array form, the basic relation between the Windex value and each posit where that Windex occurs. Item 402 is the Windex value, and item 403 is the set of posits. Depending on implementation requirements, the exact Windex is used, including any forms that exist in the increment range, such as the term "the", which only maps to a single posit, despite the fact that its related value "The" maps to a separate posit list, may be varied. This is because in order to reproduce the document, the capitalization form is necessary. This is different from the term "brown", which is actually repeated in the same form and generally is mapped to a set of posits.

These three structures: Windex, ISetM Index, and Windex Block Index, form the basis for most or all composite storage data. These provide several uses for information retrieval and analysis that do not require a full grammatical interpretation of the input, and where simple classifications are all that is required to respond to a user input. For instance, Boolean searches are common and may form the basis for many analysis methods. These three structures support these types of features as well as being able to be expanded to support various grammatical information that is required for what is considered higher-level grammatical input types. In addition, this basic indexing composite storage system can also be expanded to use non-text files and isolate data that is usable for a particular implementation. For instance, it may not be necessary for some implementations to be able to access text data found in tables and graphics; other implementations may require this as well as speech and other multimedia data. In other uses, such as a file system implementation, all such information, both textual and nontextual, will generally be stored using these three basic structures.

Figure 5:
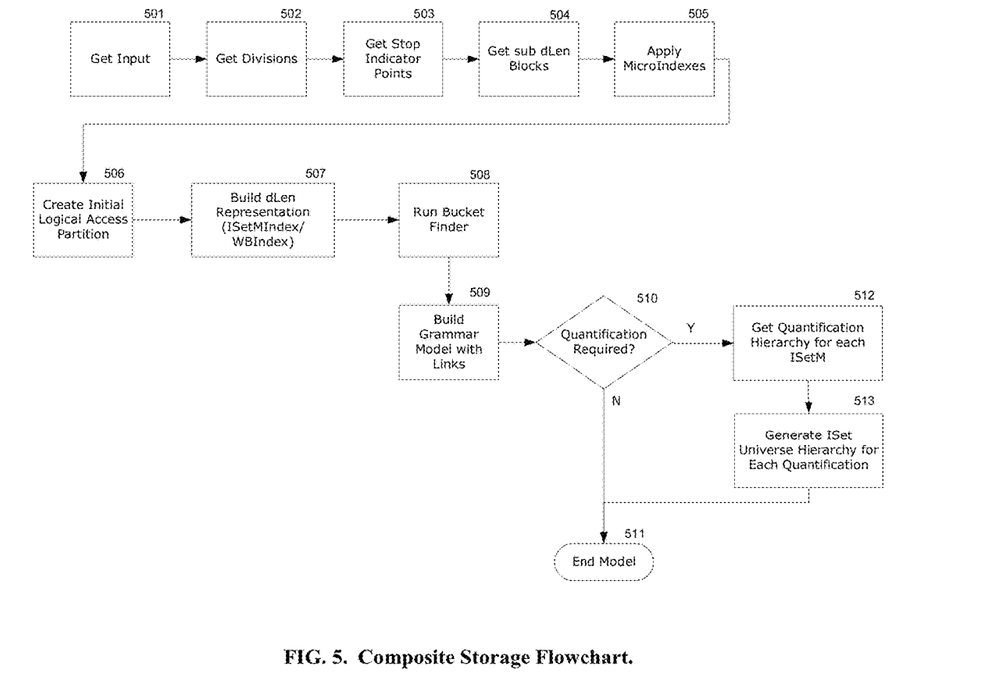
FIG. 5 illustrates an example of a Composite Storage Flowchart that is usable with the embodiments described herein.
Figure 6:
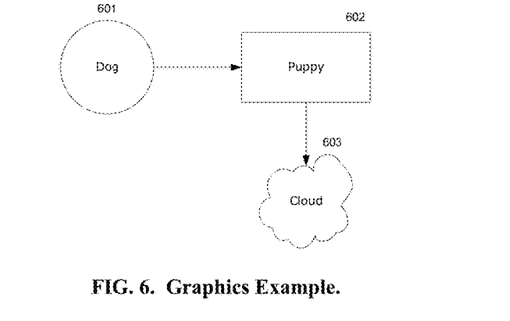
FIG. 6 illustrates examples of Graphics that are usable with the embodiments described herein.

FIG. 5 is a flowchart that illustrates the different levels and formats of information required to construct a composite storage system that is responsive to any user input. To start with, the input is retrieved 501. Any communications method can be used to get the ISetM into the system. The file formats, such as speech, text, graphics, etc., can be used to either remove possible ISetM from consideration for a given input, or to be used by the system for an implementation. Once the input has been found, then an optional get division function 502 can be performed. In many cases, the demand of big data relies on the ability to be able to divide a repository into logical parts that can be processed independently of one another and with a minimum amount of affinity and other such architectural concerns. A division may be based on security parameters, organizational departments or other such company-based designations. It is formed, however, independently of any information domain concern, since the composite structure is open domain with respect to information. Within such divisions, the three basic structures, as illustrated in FIGS. 2-4, can be stored within such divisions, even the Windex based on the size of the repository as well as the byte size of the Windex value. It is possible, depending on the implementation, to have a single Windex provided that the Windex value is large enough to store the number of terms. This may be done in concert with a logical access partition 506, described below, which handles how data is accessed out of the system, where the division 502 handles the processing of incoming data.

Once the optional division has been established, the modeling of the data can be performed to completion, including persistent storage if required by an implementation. The composite storage is comprised of data in at least two basic sections: a ISetM length, which can be divided into sub lengths, that contains most or all the grammar elements from a set of at least one language; and second, any number of extragrammatical length or lengths that contain other kinds of information outside the range of that language. Each ISetM within any ISet is stored using this method, so that there is one entry that corresponds to each ISetM of any ISet. The range of a language is defined as the alphabet, words based on that alphabet, and acceptable symbols, punctuation, and associated sounds. This separation serves to illustrate the major components that are used to determine what is properly in a language from what is not in the language. For instance, to separate the recording of a voicemail greeting from the message itself, an extragrammatical beep is heard. This then illustrates the two main elements that are language oriented: the voicemail greeting and the voicemail message.

To accomplish this, several steps are needed to process the input. Each input for composite storage should be broken down into a set of regions, usually based on file form elements such as a header, footer, text, table, graphic, multimedia, caption, address, speech, music, and other such parts that make up a particular file. Some areas, like a header, may contain other regions, such as a graphic in combination with text. This is referred to as nesting, and is a common occurrence. Region boundaries indicate a grouping of elements to define, for instance, a page of text, but do not define the grammatical content. In some cases like text regions, the grammatical and the extragrammatical division may occur inside the same region. In other regions, like a specific caption, its grammatical value may be determined along with its position in the input. Some areas, like graphics, generally contain both text and lines and other geometric shapes that may or may not have any grammatical value.

In order to determine one region from another region from a grammar perspective, a stop indicator point set member is located in item 503. This varies from implementation to implementation, and may contain all the possible language values for the various ways in which language can be communicated. For instance, if an implementation does not use speech, then the phonemes that correspond to a language, be it in waveform or other signal processing-related form, is not required. However, if the speech of a language is required to be accessed from the ISet, then the phonemes that comprise the language have to be known, so that the continuous language elements can be identified. Using the voice mail example above, the ability to distinguish between a phoneme and a nonphoneme is required so that the beep is considered a stop indicator point.

Another type of stop indicator point is a table, including databases, that have a cell or field instance. A table is used to divide data into parts, and that is indicated by a field break or a line as it is when presented to a user. They both have the same purpose: they stop the grammatical stream of text. A database also can be identified in the same manner by isolating each specific instance of a field and recognizing that there are different regions. Each region corresponds to a specific stream of grammatical information that needs to be separated in order for higher-level processes to properly analyze the grammatical content of the ISetM's region. These regions also maintain the atomicity and isolation required for large-scale data processing. A file system implementation of the regions may also include considerations of the varying data storage requirements that a region has, and may segment processing of such information.

Figure 9:
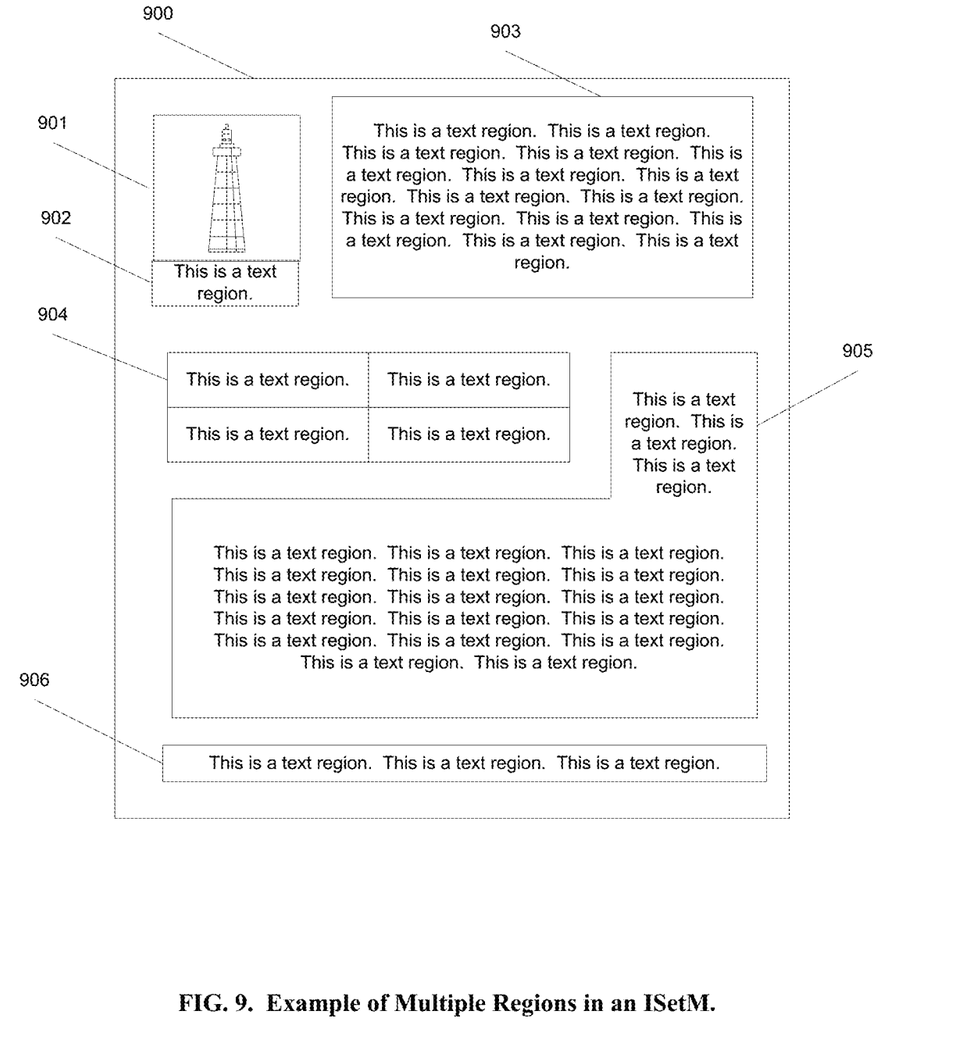
FIG. 9 illustrates an example of Multiple Regions in an ISetM that are usable with the embodiments described herein.

With the regions having been identified, the sub dLen can be found in item 504. A sub dLen is the location of the grammatical portions of the text and its surrounding data. There is a correlation between the sub dLen and the regions of an ISetM, as illustrated in FIG. 9. 900 is the entire ISetM that is used for this example. It contains a graphics image 901, which may or may not be used for an implementation of the invention. For this example, it will not be processed for data. Caption 902 is a separate entity since it describes the picture in some manner. This text is considered a sub dLen, and can be labeled sub dLen1. Since the graphics is not analyzed by this implementation, it is not related to another sub dLen. Depending on the language order for the organization of sub dLens, the next region is either 903 or 904. In English, it is considered text region 903. This is the second sub dLen. In this case, the next region is Table 904.

This region contains several sub dLens since a table or other such structure contains internal stop indicator points. Depending on the number of identifiable cells (instances of fields), there are that many sub dLens. These are related to the table region, as well as being related to text region 903. Table 904 contains sub dLens 3, 4, 5, and 6. The next sub dLen in English is text region 905. It contains a single sub dLen, which is sub dLen 7. The last region is a footer 906, and the text contained forms sub dLen 8. Therefore, in FIG. 9, there are 8 sub dLens in this sample ISetM.

Sub dLens make up a dLen, or the language ordering of most or all the data that is considered part of the grammatical data used by the implementation in any number of ways and also determines the posit number for each term in each sub dLen in the input. For most implementations, a sub dLen delimiter should be used to separate the sub dLens as they represent boundaries that many information retrieval and language analysis processes depend on for their correctness. The simple example ISetM shown in FIG. 1 represents single dLen and therefore has only one sub dLen associated with it. The example shown in FIG. 9 has 8 sub dLens, and the index value (such as sub dLen 5, indicates its position within the dLen. An ISetM has exactly one dLen. The dLen represents the grammatical data that can be extracted given the restrictions by an implementation. For instance, one implementation may require speech processing for a specific section of an ISetM; another implementation may use the data in this section and therefore it will form an sub dLen and therefore be added to the dLen.

If necessary, an optional set of one or more Microindexes 505 can be formed at this time. These can be arranged, depending on implementation requirements, in sub dLen or regions for each ISetM that is in the ISet or repository. These may be comprised of a format index, which contains the text decoration and other details within each ISetM, and can be isolated to a region or an sub dLen. Another type is the table display and other such information, which indicates the structured portions of a document that contain extragrammatical data within the range of a region or an sub dLen. Sometimes these are shown by a single character, such as a pipe (|). Other types of microindexes involve storing data that has formats that either need to be converted into text for processing for a specific implementation, and the original needs to be stored; or they contain data that cannot be used by a specific implementation but need to be added to an ISetM when reconstructed. For instance, if Picture 901 were analyzed for grammar, the original picture may or may not need to be stored. The optional graphic microindex would be used to store the original graphical information so that the picture could be reconstructed for transmission of the ISetM back to the user. Microindexes may also form the basis for the organization of a file system that maps each microindex to its set of associated bytes that can be located on a hardware or firmware deivce.

Depending on the size of the repository, there may be a need to consider if the composite storage files are to be persistently stored. In most cases, a fault tolerant system will require that the files may be stored at least once in this manner and maybe more times. In this case, it is also likely that as the repository increases in size, there is a need to partition the repository into smaller logical chunks, each with their own index files (ISetM Index, Windex Block Index, Windex). If that is the case, the Create Logical Partition 506 should be built. This can be done in any number of ways, depending on the information and the implementation details. The process is comprised of a few basic steps: identify the likely divisions that retrieval and analysis processes will require; correlate those divisions to users, groups, and possibly their IDs; determine if there are special groups or users that will require multiple parameters to identify the ISet that they will have access to. In one example, a security parameter can be used to subdivide the ISet or repository into separate blocks that relate to users, so that a user's visible repository and the security parameter can be correlated to make retrieval and analysis processes more efficient and accurate. Logical partitions can also be formed along geographical or business lines, such as partitioning data associated with the different regions of the US or partitioning engineering data across different business units engaged in different types of engineering. Any number of logical partitions can be associated with the division, and can contain their own user groups and other such information. For instance, a company may want to divide the repository into business units, each containing its own security parameter so that only users that are in that business unit that need access to a specific set of data and allows a more efficient network implementation. These may be built in concert with the input-based divisions 502.

Once the optional partition has been determined, then the composite storage for a specific ISetM can be built 507, using the ISetM Index, Windex Block Index, and Windex formats. As illustrated in FIG. 2, the Windex exists for either each partition as established in 506 or may be assigned for the entire ISet. It contains most or all the unique terms in the repository. When a new ISetM is added, the terms that are found are added if they are not already present in the Windex. The Windex in most implementations will need to be complete so that each term has a Windex value. The ISetM Index contains the two blocks as illustrated in FIG. 3, and the first block 301 can be completed while waiting for the ISetM's Windexes to be resolved. Once the full set of Windexes are known, the List Block 302 can be built. For most implementations, the preferred ordering is based on Windex value. Regardless of the order required by an implementation, the block cannot be written until the total Windexes for the ISetM is known. Once the ISetM ID has been established in 301, then the Windex Block Index of FIG. 4 can be built. The ordering of the Windexes in 401 is generally in integer order, but any order like appearance order can be applied. For each Windex in 401, the posits associated with them are listed in 402.

At this point, the composite storage is considered in its basic level. This form can support a number of information retrieval and access functions. All required information is used to solve search problems that use either Boolean or keywords or flex fetch as shown in SYSTEMS AND METHODS FOR SEARCHING AN INDEX, filed on 15 Aug. 2008, Ser. No. 12/192,834, which is incorporated herein by reference in its entirety. These types of searches benefit from the ability to count on a per document basis frequency of keywords and other such information without any information loss so that the document can be reconstructed to form most relevant parts (MRPs) and the entire document just from the data in this set of files. Also, repository information is easily obtained, such as the relation of each ISetM to a search term because the ISetM boundary is respected inside each index. This allows for even simple searches to show how popular a term is in the repository or how many ISetMs the search term appears in. Since this boundary is known, a flex fetch or a search that is based on some simple grammatical pattern can be done since the term order is preserved in this system. The flex fetch requires that most or all the terms, not just keywords, be accessible so that the order of the terms can be restricted using grammar rules dependent on word order within each ISetM, and also within each sub dLen.

At this point, the second level of the composite storage system can take place. This level determines the general grammatical form of the dLen for each ISetM in the ISet or repository. An optional Bucket Finder 508 may be run to map each term to a specific grammar function using any definable part-of-speech method. Buckets can identify an object, a subject, a modifier, a verb, and other such functions that equate or relate in some manner to a part of speech used to identify function. Each grammar function is considered a bucket, and has a starting and ending point. Most grammar functions are considered contiguous; however, a discontinuous bucket can be used. It indicates that there are several subintervals or (group of terms) that map to the same grammatical function. The purpose of the bucket is to illustrate the interval, in posits, which is covered by each grammar function. Any additional information may be stored as flags that are directly related to a specific bucket instance. Common flags include the end of a sentence, the end of a clause, the use of punctuation, and other such data. In addition, it is possible to encode for storage purposes the specific bucket values. Based on language requirements, a bucket may be encoded using an integer or an alphanumeric string to determine what values are contained within an interval, such as a code equal to twenty-seven that indicates a noun phrase that contains an interval length of two and one modifier and one object as one example when a bucket is defined as a noun phrase. Such encodings could use any length of definition of a bucket dependent on language and implementation concerns. It is possible to use existing language tools to derive the grammar so that the intervals and any additional encodings can be calculated; so long as the buckets can be formed and stored appropriately, such tools can be used with the system.

Figure 7:
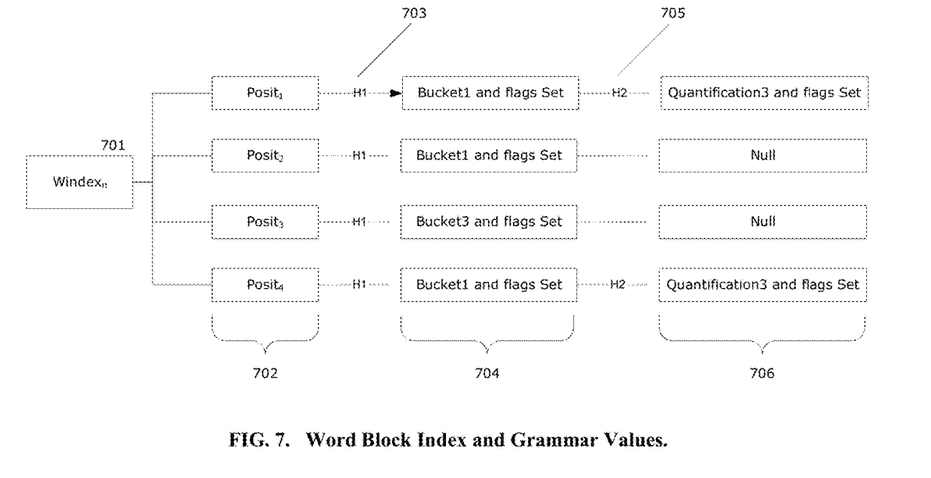
FIG. 7 illustrates an example of a Word Block Index and Grammar Values that are usable with the embodiments described herein.

Concurrently with bucket building, if used, or after another process performs a similar function, the optional grammar level 509 can be added to the composite storage system. This mapping is shown in FIG. 7. The determination of the bucket or similar interval allows each term to be mapped to a specific grammatical function, which is another way of saying that each posit maps exactly to a single grammatical function or bucket. Using the Windex Block Index, the Windex is known, and so is the position of the term that maps to a specific bucket. If, for example, FIG. 1 were used, and "dog" mapped to a specific bucket called object, then, the Windex for dog 701 would be located, the posit 702 would be located (which is equal to 4), then the optional hash function 703 can be used to establish the link to the storage 704 for the object bucket, which might equal 1 (bucket1). Additionally, any encoding can be used, such as shown above using the integer 27, to indicate a bucket membership and position within the bucket of the TU "dog". Otherwise, a direct storage method can be used. In addition, if any flags are set for this instance, these can be held with the bucket value in the same structure or linked to a flag structure. Any number of possible data structures can be used, such that the grammar is contained within a separate data structure, or may be directly added to the same matrix that the current posit contains.

At this point, the grammar level for the ISetM is known, such as the objects that exist in the entry or the location of verbs. This information can be used in a variety of language-based analysis functions. For instance, an object search can be performed by looking up most or all the buckets that correspond to an object, including relations such as a subject can be considered equivalent to an object. Since the search term can be converted into a set of Windexes, then each posit value in the Windex can map to see if acceptable bucket value occurs at that posit. If so, then this posit value can be used as part of an object search answer. In addition, most or all the MRPs and other reconstructions may be done on the document. With this information, all sorts of language analysis is possible. For instance, a request could be made to locate all the possible functions of a specific object, which can be found using an object search. For instance, the object search locates all the places where "hammer" is used as an object, and then can locate the functions based on the bucket membership of members the current sentence or related sentences, especially when the term "hammer" might be an object in several sentences. More information about the objects that a "hammer" can be used is also available, especially when the verb buckets can be related to a parent object that either is equal to "hammer" or considered an object of "hammer".

The next level of the composite storage system is also optional 510, and if used, it quantifies an ISetM. If there is no further processing required, then the system terminates 511, which means that the ISetM has gone as far as necessary for a given implementation. Otherwise, this Quantification Process 512 is performed, and it refers to isolating specific intervals within the ISetM using a specific set of rules to determine the focus terms that are used for the identification of the intervals. Once such intervals are established, they are normally organized on a per-ISetM basis into a hierarchy or multiple hierarchies, depending on number of quantifications used, to present to the user or another system. There are several types of quantification, and they include: topics, dates, locations, among others. Quantification works by identifying the focus terms using a set of rules for that type of quantification. For instance, the topic generally uses those terms that mapped to the object and subject buckets, and therefore also requires that the grammar level having been done. The actual interval then is determined once all the related terms that can comprise a quantification focus term or set of terms based on grammar are known. In addition, different implementations might require that different quantification types have different rules for an interval; for example some intervals may be closed, or may have an one or more open ends.

Once the intervals are known, each term that comprises an endpoint or an internal mention of the quantification focus term can be identified and added to the composite storage system. In addition, other flags that contain information about the focus term instance can also be identified, such as a common form for a topic, the current mention is different from what is the common form, or the quantification ID for that interval. For instance, "dog house" may be the quantification ID, but the current instance may equal "canine house". The process then is as follows. A focus term is identified 701, and its posit located 702, and it's automatically mapped to a grammar level value 704. Then, it is mapped to the quantification level 706 using an optional hash function 705. Again, depending on the data structures used, this may be a linked structure or may be an additional matrix element. A set of variables may need to be used if the common form of the topic contains a variation from the original, which in this case is equal to "dog".

If required, an optional Quantification Hierarchy Universe Generation 513 can be performed. Depending on the type of quantification required, a set of rules can be applied to relate ISetM quantifications to an entire ISet or any arbitrary group of ISetMs that can constitute a universe. Once such rules are applied, a new hierarchy can be formed showing the interrelations between more than one ISetM. The process that manages relations between ISetM is comprised of the following steps. First, each ISet that is required is expressed in terms of its hierarchical tree, including at which the level that each Quantification ID (QID) appeared. This is constructed by the data in FIG. 7, using the Quantification element. A set of relations can be determined, and any type of commonality testing and other such comparisons can be made to relate each ISetM hierarchy to another hierarchy in order to combine them into one hierarchy. For instance, there are two ISetMs in a repository and each ISetM the following topical hierarchies. One ISetM contains the following: level 1="Dog", level 2 ="Physical Characteristics", "Intelligence Level", and "Companionship Qualities". The other ISetM contains the topic hierarchy: level 1="Animals", level 2="Dog", "Cow", and "Horse". Level 3 under "Dog"="Purebreds", "Mutt". The level and other data related to the quantification of topics is stored in 706, and pulled out. One example of building a universal hierarchy is the combining of these two hierarchies by adding information from one hierarchy to another. In this case, dog is found to be a subtopic under animal. Therefore, when combining these two, "animal" is the level 1, and "dog", "Cow", and "Horse" are at level two, as in the $2^{nd}$ ISetM. However, there is data about "Dog" that needs to be added from ISetM, which is the data at level 3 in the universal hierarchy, which is then "Purebreds", "Mutt", "Physical Characteristics", "Intelligence Level", and "Companionship Qualities".

Figure 8:
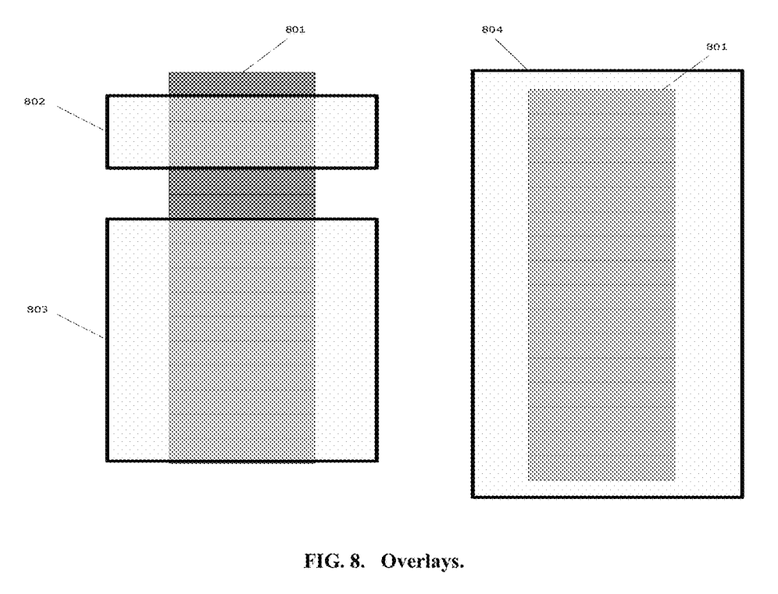
FIG. 8 illustrates an example of Overlays that are usable with the embodiments described herein.

A hierarchy generation that contains multiple documents is a form of an overlay, which contains information from several different sources based on a focus set, usually a set of TUs, to form new relations. In other cases they can be used to partition one data set from another data set, such as a security overlay used to partition documents based on a security parameter. Examples of overlays are shown in FIG. 8. Item 801 is a representation of the entire repository. Item 802 is an overlay that covers only a small portion of the entire repository. Overlay 803 covers a different portion of the repository and is formed using different parameters. Any number of overlays can be created, and can be linked back to the underlying data as shown in FIG. 7. This can be formed, for instance, by using a specific location found in text, and that has a quantification label found to be equal to that specific location. These overlays may be used in a real-time system since they can be created on the fly for any number of users at any time.

In some cases, an overlay may be used to isolate a set of data found in FIG. 7 that is repository wide and has other pruning or other operations required of it. This is common for the QID variables. For instance, an implementation requires that the date/time be stored in a hierarchy so that this information can be persisted, or so it can be used for other types of analysis, or so such information can be sent back to the user so he can see what is available in the system. Overlay 804 represents such a data set, and covers the entire repository so that repository-wide functions can be easily accessed. The use of this in a file system would replace the need for directories as it would allow any type of data organization to be supported. For instance, if there is a set of data that is used by two different types of knowledge workers, one type that needs data arranged using topical QIDs and another that needs data arranged using geographical QIDs, the data could be stored once and by using overlays would be able to display to a myriad of applications these various QIDs regardless of the underlying files that contain the data. This would allow both structured and unstructured data to be mined, categorized, organization, analyzed, etc. using overlays that abstract the underlying files using the information inside to determine the presentation to the user. The overlays could be either statically or dynamically created and destroyed while maintaining the raw information used to create them.

Embodiments described herein operate on or with any network attached storage (NAS), storage array network (SAN), blade server storage, rack server storage, jukebox storage, cloud, storage mechanism, flash storage, solid-state drive, magnetic disk, read only memory (ROM), random access memory (RAM), or any conceivable computing device including scanners, embedded devices, mobile, desktop, server, etc. Such devices may comprise one or more of : a computer, a laptop computer, a personal computer, a personal data assistant, a camera, a phone, a cell phone, mobile phone, a computer server, a media server, music player, a game box, a smart phone, a data storage device, measuring device, handheld scanner, a scanning device, a barcode reader, a POS device, digital assistant, desk phone, IP phone, solid-state memory device, tablet, and a memory card.

Note that any of the functions described herein may be implemented in hardware, software, and/or firmware, and/or any combination thereof. When implemented in software, the elements of the present invention are essentially the code segments to perform the necessary tasks. The program or code segments can be stored in a processor readable medium. The "processor readable medium" may include any physical medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, etc. The code segments may be downloaded via computer networks such as the Internet, Intranet, etc.

Figure 10:
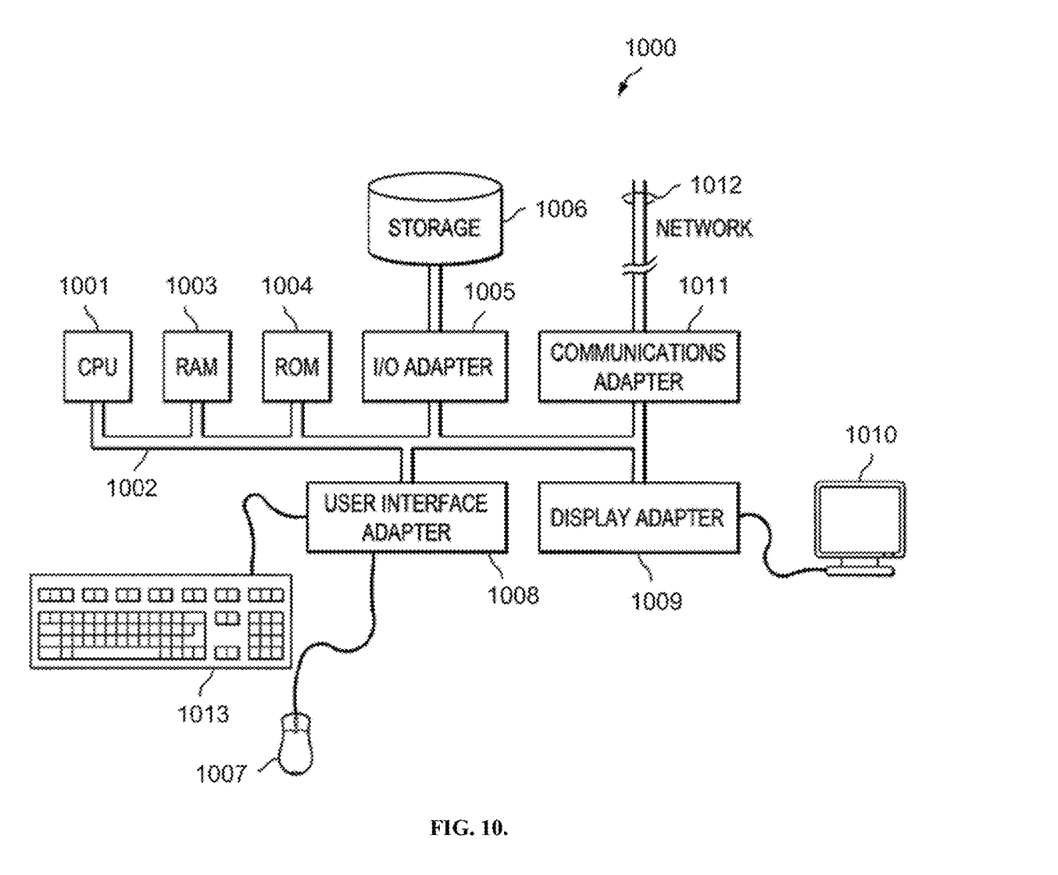
FIG. 10 depicts a block diagram of a computer system which is adapted to use the present invention.

FIG. 10 illustrates computer system 1000 adapted to use the present invention. Central processing unit (CPU) 1001 is coupled to system bus 1002. The CPU 1001 may be any general purpose CPU, such as an Intel Pentium processor. However, the present invention is not restricted by the architecture of CPU 1001 as long as CPU 1001 supports the inventive operations as described herein. Bus 1002 is coupled to random access memory (RAM) 1003, which may be SRAM, DRAM, or SDRAM. ROM 1004 is also coupled to bus 1002, which may be PROM, EPROM, or EEPROM. RAM 1003 and ROM 1004 hold user and system data and programs as is well known in the art.

Bus 1002 is also coupled to input/output (I/O) controller card 1005, communications adapter card 1011, user interface card 1008, and display card 1009. The I/O adapter card 1005 connects to storage devices 1006, such as one or more of a hard drive, a CD drive, a floppy disk drive, a tape drive, to the computer system. The I/O adapter 1005 is also connected to printer (not shown), which would allow the system to print paper copies of information such as document, photographs, articles, etc. Note that the printer may a printer (e.g. inkjet, laser, etc.), a fax machine, or a copier machine. Communications card 1011 is adapted to couple the computer system 1000 to a network 1012, which may be one or more of a telephone network, a local (LAN) and/or a wide-area (WAN) network, an Ethernet network, and/or the Internet network. User interface card 1008 couples user input devices, such as keyboard 1013, pointing device 1007, and microphone (not shown), to the computer system 1000. User interface card 1008 also provides sound output to a user via speaker(s) (not shown). The display card 1009 is driven by CPU 1001 to control the display on display device 1010.

The invention claimed is:

1. A method of storing data, including natural language information, the method comprising:

receiving at a computer, input data as an input text stream;

parsing, by the computer, the input data to form a term unit matrix, the term unit matrix comprising a plurality of term units, wherein at least one of the plurality of term units comprises a linguistic word, the linguistic word comprises text content of the input text stream, the linguistic word comprises plural characters, each term unit is one of a functional term unit or a content term unit, and the term unit matrix is a substantially lossless representation of the input data;

forming, based on processing the term unit matrix to transform the data, by the computer, a Windex, the Windex having a plurality of inteaer values corresponding to the plurality of term units of the term unit matrix, wherein the Windex is an ordered index with each entry mapped to respective ones of a plurality of ranges of numbers based on grammar-embedded rules, wherein at least one of the plurality of integer values numerically encodes an entirety of the linguistic word as a single integer value, wherein a first range of the numbers is related with functional term units, and a second range of the numbers is related with content term units;

transforming, based on the term unit matrix, by the computer, the input data to form an ISetM index wherein the ISetM index is a listing of the plurality of integer values;

forming based on the Windex, by the computer, a Windex Block Index from the transformed input data, wherein the Windex Block Index is a listing of the plurality of integer values and their respective locations in the input data;

storing, by the computer, the Windex, the ISetM Index, and the Windex Block Index in a memory of the computer, wherein the Windex is different from the ISetM Index, the ISetM Index is different from the Windex Block Index, and the Windex is different from the Windex Block index;

processing, by the computer, the Windex, the ISetM Index, and the Windex Block Index from the memory to form a composite storage of the input data as a model for retrieving natural language information and other types of information found in any type of documentation, wherein the composite storage includes two sections: a number of extra grammatical length or lengths that contain other kinds of information outside the range of language and a ISetM length, which can be divided into sub lengths, that contains most or all the grammar elements from a set of at least one language; and performing, by the computer, a search on the input data using the composite storage of the input data to retrieve, based on classifications, a portion of the input data in response to user's input without requiring a full grammatical interpretation of the user's input, wherein the retrieving further includes the filtering the ISetM to determine whether the ISetM is responsive to the user's input, if the ISetM does not contain a value within the first range, regardless of the alphanumeric order of the terms, the ISetM is not responsive to the user's input.

2. The method of claim 1, further comprising retrieving a portion of the data using the composite storage of the data.

3. The method of claim 1, wherein the memory resides on at least one of:

a computer, a laptop computer, a personal computer, a personal data assistant, a camera, a phone, a cell phone, a mobile phone, a computer server, a media server, a music player, a game box, a smart phone, a data storage device, a measuring device, a handheld scanner, a scanning device, a barcode reader, a point-of-sale (POS) device, a digital assistant, a desk phone, an internet protocol (IP) phone, a solid-state memory device, a tablet, or a memory card.

4. A computing device comprising:

one or more processors; and a non-transitory computer-readable medium storing programming instructions that are executed by the one or more processors to:

receive at a computer input data comprising at least one document;

parse the input data to form a term unit matrix, the term unit matrix comprising a plurality of term units, wherein at least one of the plurality of term units comprises a linguistic word, the linguistic word comprises plural characters, each term unit is one of a functional term unit or a content term unit, and the term unit matrix is a substantially lossless representation of the input data;

form, based on processing the term unit matrix to transform the input data, a Windex, wherein the Windex comprises a plurality of integer values that are determined based on grammar-embedded rules, wherein at least one of the plurality of integer values numerically encodes an entirety of the linguistic word as a single integer value, wherein the Windex is an ordered index with each entry mapped to one of a plurality of ranges of numbers based on determined grammar function, wherein a first range of the numbers is related with functional term units, and a second range of the numbers is related with content term units;

form, based on the process the term unit matrix to transform the input data, an ISetM Index, wherein the ISetM Index is a listing of integer value entries of the Windex;

form, based on the Windex, a Windex Block index from the transformed input data, wherein the Windex Block Index comprises a listing of integer value entries of the Windex and their respective locations in the input data;

store the Windex, the ISetM Index, and the Windex Block Index in a memory a the computer;

process the Windex, the ISetM Index, and the Windex Block Index from the memory to form a composite storage of the input data as a model for retrieving natural language information and other types of information found in any type of documentation, wherein the composite storage is comprised of data in at least two basic sections: a number of extra grammatical lenght or lenghts that contain other kinds of information outside the range of language and a ISetM length, which can be divided into sub lengths, that contains most or all the grammar elements from a set of at least one language, wherein the Windex is different from the ISetM Index, the ISetM Index is different from the Windex Block Index, and the Windex is different from the Windex Block Index; and perform a search on the input data using the composite storage of the input data to retrieve, based on classifications, a portion of the input data in response to user's input without requiring a full grammatical interpreatition of the user's input, wherein the retrieving further includes the filtering the ISetM to determine whether the ISetM is resoonsive to the user's input, if the ISetM does not contain a value within the first range, regardless of the alphanumeric order of the terms, the ISetM is not responsive to the user's input.

5. The computing device of claim 4, wherein the programming further comprises instructions to retrieve a portion of the input data using the composite storage of the input data.

6. The computing device of claim 4, wherein the computer-readable medium comprises at least one of a computer, a laptop computer, a personal computer, a personal data assistant, a camera, a phone, a cell phone, a mobile phone, a computer server, a media server, a music player, a game box, a smart phone, a data storage device, a measuring device, a handheld scanner, a scanning device, a barcode reader, a point-of-sale (POS) device, a digital assistant, a desk phone, an internet protocol (IP) phone, a solid-state memory device, a tablet, or a memory card.

7. A non-transitory computer-readable medium storing programming instructions that are executed by a processor of a computer to:

receive at the computer input data comprising at least one document;

parse the input data to form a term unit matrix, the term unit matrix comprising a plurality of term units, wherein at least one of the plurality of term units comprises a linguistic word, the linguistic word comprises plural characters, each term unit is one of a functional term unit or a content term unit, and the term unit matrix is a substantially lossless representation of the input data;

form, based on processing the term unit matrix to transform the input data, a Windex, wherein the Windex comprises a plurality of integer values that are determined based on grammar-embedded rules, wherein at least one of the plurality of integer values numerically encodes an entirety of the linguistic word as a single integer value, wherein the Windex is an ordered index with each entry mapped to one of a plurality of ranges of numbers based on determined grammar function, wherein a first range of the numbers is related with functional term units, and a second range of the numbers is related with content term units;

form, based on the processing the term unit matrix to transform the input data, an ISetM Index, wherein the ISetM Index is a listing of integer value entries of the Windex;

form, based on the Windex, a Windex Block index from the transformed data, wherein the Windex Block Index comprises a listing of integer value entries of the Windex and theft respective locations in the input data;

store the Windex, the ISetM Index, and the Windex Block Index in a memory of the computer;

process the Windex, the ISetM Index, and the Windex Block Index from the memory to form a composite storage of the input data as a model for retrieving natural language information and other types of information found in any type of documentation, wherein the composite storagae is comprised of data in at least two basic sections: a number of extra grammatical length or lengths that contain other kinds of information outside the range of language and a ISetM length, which can be divided into sub lengths, that contains most or all the grammar elements from a set of at least one language, wherein the Windex is different from the ISetM Index, the ISetM Index is different from the Windex Block Index, and the Windex is different from the Windex Block Index; and perform a search on the input data using the composite storage of the input data to retrieve, based on classifications, a portion of the input data in response to user's input without requiring a full grammatical interpretation of the user's input, wherein the retrieving further includes the filtering the ISetM to determine whether the ISetM is responsive to the user's input, if the ISetM does not contain a value within the first range, regardless of the alphanumeric order of the terms, the iSetM is not responsive to the user's input.

8. The non-transitory computer-readable medium of claim 7, wherein the input data comprises at least one document.

9. The non-transitory computer-readable medium of claim 7, wherein the search comprises a search request.

10. The non-transitory computer-readable medium of claim 9, wherein the search request comprises a term.

11. The non-transitory computer-readable medium of claim 10, wherein the term comprises plural characters.

12. The non-transitory computer-readable medium of claim 7, further comprising retrieving, by a computing device, a portion of the input data using the composite storage of the input data.

13. The non-transitory computer-readable medium of claim 12, wherein computing device comprises at least one of a computer, a laptop computer, a personal computer, a personal data assistant, a camera, a phone, a cell phone, a mobile phone, a computer server, a media server, a music player, a game box, a smart phone, a data storage device, a measuring device, a handheld scanner, a scanning device, a barcode reader, a point-of-sale (FOS) device, a digital assistant, a desk phone, an internet protocol (IP) phone, a solid-state memory device, a tablet, or a memory card.

\* \* \* \* \*

UNITED STATES PATENT AND TRADEMARK OFFICE
CERTIFICATE OF CORRECTION

| | |
|---|---|
| PATENT NO. | : 9,922,115 B1 |
| APPLICATION NO. | : 13/763710 |
| DATED | : March 20, 2018 |
| INVENTOR(S) | : Athena Ann Smyros |

It is certified that error appears in the above-identified patent and that said Letters Patent is hereby corrected as shown below:

In the Claims

In Column 13, Line 19, Claim 1, delete "inteaer values" and insert --integer values--.

In Column 14, Line 39, Claim 4, delete "based on the process the term unit matrix" and insert --based on the processing the term unit matrix--.

In Column 14, Line 48, Claim 4, delete "in a memory a the computer" and insert --in a memory of the computer--.

In Column 14, Line 56, Claim 4, delete "lenght or lenghts" and insert --length or lengths--.

In Column 14-15, Line 67, Claim 4, delete "grammatical interpreatition" and insert --grammatical interpretation--.

In Column 15, Line 3, Claim 4, delete "resoonsive to the user's input" and insert --responsive to the user's input--.

In Column 16, Line 2, Claim 7, delete "and theft respective locations" and insert --and their respective locations--.

Signed and Sealed this
Twelfth Day of June, 2018

Andrei Iancu
*Director of the United States Patent and Trademark Office*